United States Patent [19]
Kocznar et al.

[11] Patent Number: 5,135,095
[45] Date of Patent: Aug. 4, 1992

[54] PORTABLE HAND DEVICE FOR MACHINE PROCESSING OF DATA CARRIED ON A DATA CARRIER

[75] Inventors: Wolfram Kocznar, Innsbruck; Kurt Wallerstorfer, Strasswalchen, both of Austria

[73] Assignee: Skidata Computerhandelsgesellschaft M.b.H., Nhard-Gartenau, Austria

[21] Appl. No.: 700,089

[22] Filed: May 6, 1991

Related U.S. Application Data

[63] Continuation of Ser. No. 381,744, filed as PCT/AT87/00075, Dec. 11, 1989, abandoned.

[30] Foreign Application Priority Data

Dec. 12, 1986 [AT] Austria ................... 3303/86

[51] Int. Cl.⁵ ............................................. G07F 7/08
[52] U.S. Cl. ......................................... 194/209; 235/380
[58] Field of Search ............... 194/208, 209, 210; 235/379, 380; 364/403, 404, 408; 200/5 A, 512

[56] References Cited

U.S. PATENT DOCUMENTS

| | | | |
|---|---|---|---|
| 3,556,274 | 1/1971 | Mizuta et al. | 194/210 |
| 4,053,735 | 10/1977 | Foudos | |
| 4,060,703 | 11/1977 | Everett | 200/5 A |
| 4,308,804 | 1/1982 | Guibord et al. | 235/379 X |
| 4,454,414 | 6/1984 | Benton | 235/379 |
| 4,513,199 | 4/1985 | Sidline | 194/208 X |
| 4,529,870 | 7/1985 | Chaum | 235/379 X |
| 4,686,357 | 8/1987 | Douno et al. | 235/379 |
| 4,812,632 | 3/1989 | Kakinuma et al. | 235/379 X |

FOREIGN PATENT DOCUMENTS

| | | |
|---|---|---|
| 0061373 | 9/1982 | European Pat. Off. |
| 0168836 | 1/1986 | European Pat. Off. |
| 2339215 | 8/1977 | France |
| 2054928 | 2/1981 | United Kingdom |
| 2170338 | 7/1986 | United Kingdom |

*Primary Examiner*—F. J. Bartuska
*Attorney, Agent, or Firm*—Lorusso & Loud

[57] ABSTRACT

An autonomous device that can be carried in one hand is used for checking and at least partially obliterating machine-readable data carriers. The device contains all components necessary to read and modify data and is provided with a card conveyor and a line-by-line printing device for processing data carriers having the form of card tokens.

44 Claims, 8 Drawing Sheets

PORTABLE HAND DEVICE FOR MACHINE PROCESSING OF DATA CARRIED ON A DATA CARRIER

This is a continuation of copending application Ser. No. 07/381,744 filed as PCT/AT87/00075, Dec. 11, 1987 now abandoned.

The invention applies to a portable hand device for machine processing of data on data carriers, which has a housing, a display that is preferably lighted, an input keyboard, a computer, a memory and a power source.

Up until now, known devices of this type have mainly been stationary parts of large data processing systems. Only in more recent times have smaller devices of this type become known, which however are tied to one location as before and are planned for an exceptionally limited purpose, for example, as parts of public telephone equipment, into which a pre-paid value card that has been paid up for the amount of the phone call can be inserted instead of putting coins in. A similar device, which executes a simple check of the master data written on the card, is a further component of the automatic payment machine.

For a partial or complete devaluation of different value cards, like ride tickets, entrance tickets, etc., simple hand devices, like hole punchers, stamps, etc, are usually used. A partial devaluation of the card requires subdivisions appearing on the card, thus usually pre-printed, in the smallest value units, whereby each price must correspond to a whole number multiple. For user control, at least the specification of the value unit multiples is required, if the performance values vary. Cards that cost different amounts must be stored individually, i.e. production and storage require a lot of effort.

The goal of the invention was to greatly increase the application range of machine processed value cards, while avoiding the existing disadvantages. It proposes an autonomous, one-hand portable hand device for processing, which includes a read/write device having a device to make visible any changed data content that may be present on the data carrier.

Using the execution of the one-hand portable hand device that is the subject of the invention—i.e, a handy device with low weight and small size—it is now possible to significantly increase the application area of data carriers that can be machine processed and to implement them across all business and service areas, particularly a neutral data carrier without a specific application purpose with a device freed from specific auxiliary mechanisms and limited exclusively to its basic function, namely reading and changing the value. It is clear that the multiplicity of organizational and business operations that make stationary data processing systems attractive, can be made accessible to a broader consumer and services sector through the hand device that is the subject of the invention. This is particularly advantageous, where a company offers services at different locations or at different times. This includes, for example, amusement parks, hotels, campgrounds, tourist services, groceries, season tickets for theater, concerts, etc., collected receipts from gas stations, taxi companies, parking garages, season tickets for swimming clubs, ski lifts, fitness centers etc.

Advantages like these result if several companies offer similar or related services, for example, mass transit systems, regional ski passes, events with different sales or consumer offerings.

Every sales person, every service person, every controller can control and devalue data carriers with his hand device. Since it takes hardly any time, the consumed service can be received directly Unauthorized consumption can basically be ruled out and simultaneously, the customer can be given an overview of the current "account status" of his data carrier, since it is visually readable on the data carrier. It doesn't make any difference, in and of itself, whether the payment for the data carrier is done in advance or afterwards.

A further advantage results in that the customer can determine the value of a pre-paid data carrier according to his individual needs, since any amount that is available to the customer can be read into the empty data carrier. The purchase price thus corresponds just as little to a multiple of a value unit as the amounts to be debited, thus the individual partial devaluations.

The input keyboard can be equipped with fixed value keys and/or number keys or function keys. Another option is the input keyboard with a see-through key film, which is attached to a contact plate, while an insert slot is provided between the key film and the contact plate for a key name sheet. In this way, the key assignment can proceed with function keys corresponding to the selected key name sheet.

In another version, the input keyboard has a fluid crystal display covered by a touch screen, whereby the key assignment can be programmed. A common LCD for data display and key display can be used here.

Since the illumination takes a significant part of the current supply, it is suggested that an illumination sensor be provided on the top of the housing. The input keyboard can be lighted from below with a light film.

For value cards with magnetic systems, a first version of the hand device is suitable, in which the read/write device has a magnetic read/write head and a print head, whereby the housing is provided with an insert slot and a connecting guide for the data carrier, with the read/write device attached in its area.

For the required relative motion between the read/write device and the value card, it is conceivable to fix the value card in the insert slot and slide the read/write device in the housing between the corresponding positions. But it is preferable to provide a value card transport device, that is driven with an electric motor and provided with a mechanical reduction gear. In this way, this version provides that the transportation device has a side drive guide for the value card that goes out at an angle from the insert slot and parallel to the upper site of the housing. In the angle area, upper and lower transport rollers are provided.

Since it is advantageous to move the printer head (depending on its structure) independently of the read/write device and/or the transport device, there is preferably a clutch between the reduction gear and the print head moving part. In the same way, the print head could also have its own drive, independent of the transport device. One version provides that the print head is composed of a thermal print head and can be moved along an axis between the rest and print position via an eccentric link which can be connected to the drive via the clutch. A magnetic clutch is particularly planned as a clutch.

In this version, a space-saving design is attained in that the lower transport rollers are attached with a coaxial space and the lower transport roller forms the printer base for the thermal print head attached between the lower transport rollers.

Another version uses an ink-jet print head, which can be moved perpendicularly to the guide path of the value card on its underside between line print positions that are parallel to the guide path.

An additional safeguard for a data carrier designed as a value card, on which the machine-readable and also the visibly readable information can be damaged, can be attained in that the hand device also has a notching or stamping device for identification of the value card. In this way, the number of processing procedures can be known.

Issue of neutral, passive value cards, which for example have two magnetic strips—one for basic data and the other for variable data, can also be done with the hand device, since only the purchase price is printed on the card—without printed divisions and specified number of value units.

However, the hand device that is the subject of the invention, is not just suitable for processing of data on value cards with a magnetic layer, that is passive data carriers, but also can work additionally with active data carriers. This means those that contain a computer, a memory and a display, and if necessary for dialog without contact, are equipped with a stand/receive unit. Therefore, this version of the hand device according to the invention has a read/send device that is provided with a send/receive unit for long distance data transmission, whereby the transmission distance for achieving clear coordination is selected to be so short that the active data carrier must be brought close to the hand device, or the hand device brought close to the active data carrier. The data transmission to the data carrier is the requirement for being coordinated with the hand device, so that the data and/or revised data can be made visible on the display of the data carrier. An approach distance up to 30 cm is preferable, between 10 and 20 cm is especially suitable.

A first version provides that the send/receive unit is designed for radio transmission with a recommended carrier frequency up to 250 kHz. Carrier frequencies up to 100 kHz are especially used since these require lower send energy, which is important for the energy supply of the hand device and the data carrier, and magnetic antennas can be used.

In order not to disturb the dialog, a preferred version provides that the carrier frequencies for data send and data receive are different. In this way, the transmission can be located with a send oscillator in the hand device, if the send/receive unit of the data carrier is equipped with a frequency divider.

In another version, it is planned that an interface and/or send/receive unit be supplied for dialog with stationary data processing equipment. For connection with a cash register or a stationary data processing system, it is possible, for example, to provide the system with a mounting into which the hand device fits like a kind of drawer. In this way, the services controlled via the hand device can also be evaluated statistically or profits can be divided between several companies corresponding to the respective service. In addition, the hand device can have a clock, a battery status indicator, a self-test feature, etc.

Another version provides that the send/receive unit for light wave transmission is specially designed for the infrared range. The send/receive unit of the hand device can thus naturally be used either for dialog with a stationary data processing system or with an active data carrier.

Since in another suggested version, the data carrier has a ready switch that is activated via a signal output from the hand device, minimal energy consumption is required, so that service life of several years can be achieved by the data carrier. Since the data carrier contains a read/write memory, its repeated use is given by clearing and input of new data. A simple version of this type can be used as a yearly card, extended i.d. for repeated events, etc., whereby only a validity date need be checked by the hand device. The validity date can be stored again for reuse after expiration.

It is in this type of usage that the active data carriers are suited for mass use as well, since the creation costs of the data carrier are an acceptable percentage of the value incorporated in it.

An active data carrier that is especially suited for use with the hand device that is the subject of the invention has a housing on which there is a fastening method to attach it to the person or to an object. A recommended version provides that an arm band be used as a fastening medium so that the data carrier is designed similar to a wrist watch. Even here there is a practical addition for the user that the housing contains an electronic clock so that the data carrier can be used as a standard clock.

It is practical, above all, for use as a trip ticket or entrance ticket if the housing is provided with a device to take the picture of the data carrier owner. It is recommended that the device have a transparent removable cover that is provided with an adhesive coating on the inner side, on which a photo can be stuck to prevent unauthorized exchange of photos.

A battery that can be recharged if necessary or a solar cell can be used as power source for the hand device and/or the data carrier. A write/read memory that can be used is implemented in CMOS technology, for example, by an EEPROM, CMOS RAM or the like.

The data carrier fastening medium selected will naturally be suited to the application, it can be designed not only as mountings for an arm band, but also as a fastening clip, as a self-adhesive layer, as a car key chain, etc.

It is also practical if the housing is made of an upper part and a lower part, preferably put together so that they can not come apart, whereby the fastening medium is provided on the lower part.

In another recommended version, it is planned that the data carrier have an individual, visually readable number that is stamped or printed on it. Using the visually readable number it is possible to produce a journal when that type of data carrier is first issued, in order to be able to produce a copy in case of any possible loss of the stored data and/or the data carrier and it is recommended that an attached photo is also provided. By calling up the number, the respective data can then be determined. The individual numbers are preferably also written in to the data carrier during manufacturing, so that the number can also be called up from the memory of the data carrier.

In the following, the invention will now be described in more detail using the figures in the attached drawings, without being listed to them.

They show.

Figure 3:
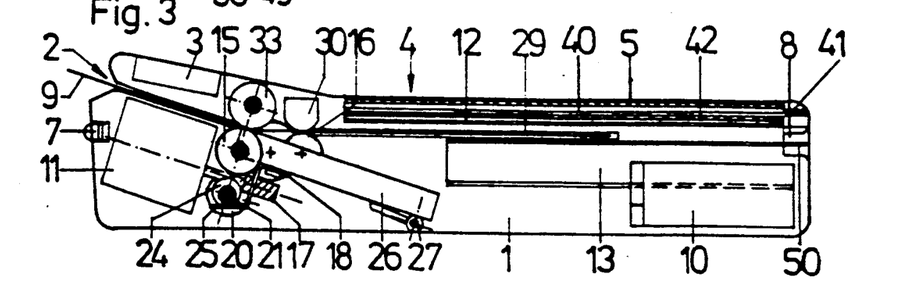
FIG. 3 a cross section through line III—III of FIG. 2.
Figure 4:
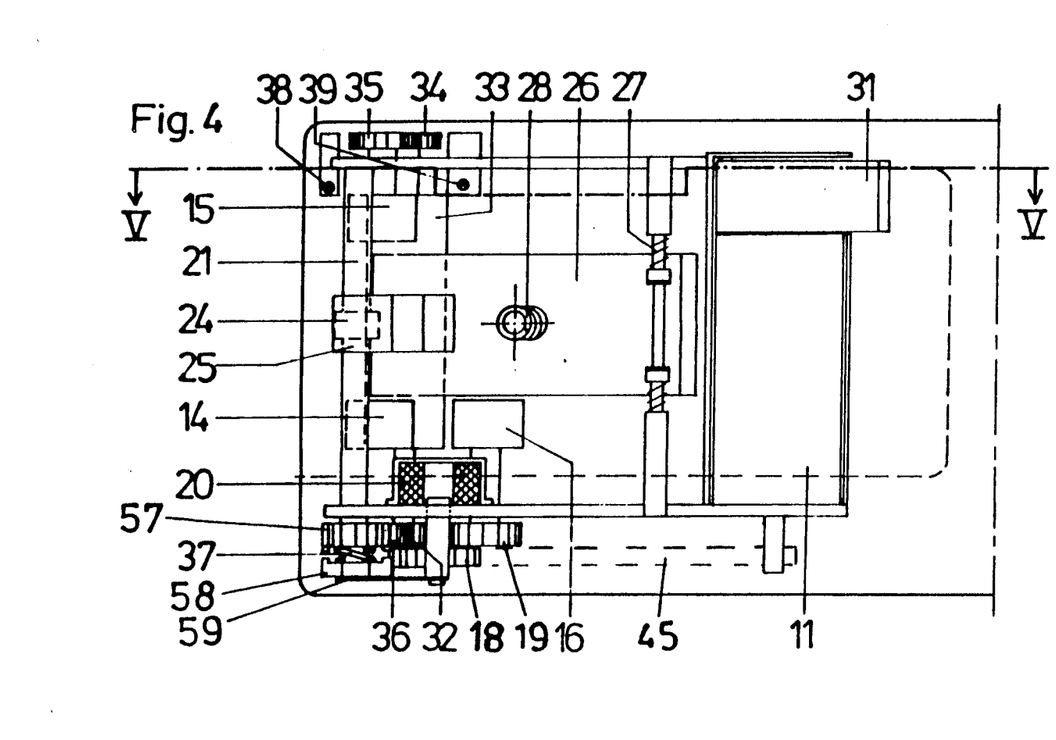
FIG. 4 and 5, and/or 6 and 7 show representations corresponding to FIG. 2 and 3 of a second and third execution example.
Figure 5:
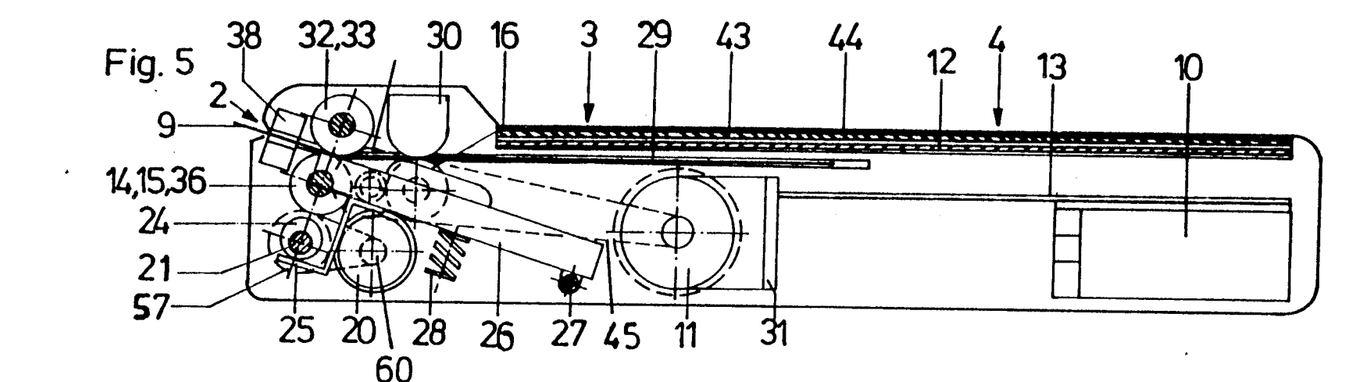

A portable hand device according to the invention encompasses; for processing passive data carriers 9 in the form of value cards (FIG. 9,10) equipped with magnetizable stripes 46; a housing 1 with an insert slot 2, on that a display 3 for data display, especially en LCD and an input keyboard 4 (FIG. 1 to 3. 6. 7) In the version according to FIG. 4 and 5, an input keyboard with a fluid crystal display 43 is also provided, so that a common LCD is designed for the data display and the keyboard. For convenient usage, the housing 1 preferably has a length of about 20 cm, a width of about 9 cm and a height of about 4 cm.

Figure 9:
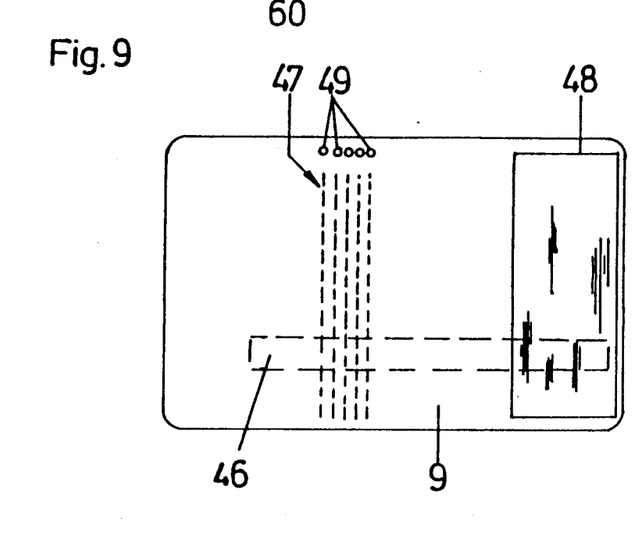

In the inside of the housing 1, the insert slot 2 continues into side guide grooves 29, whereby one side guide groove 29 is equipped with a photoelectric barrier 38 and the interruption of the photoelectric barrier 39 by the inserted data carrier 9 sets a transport device in motion, which pulls in the data carrier 9. The photoelectric barrier 39 in FIG. 2 that is provided directly in the connection with insert slot 2 serves for recognition of the data carrier 9, which stops or reverses the transport mechanism. This could also be done by an end stop at the end of the side guide grooves 29 or a photoelectric barrier mounted there. The housing also includes a read/write device with a read/write head 30. In addition, the read/write device also includes a print head for visually readable registration of the input and revised data, which are printed on the data carrier in lines 47 (FIG. 9,10). Each printed line 47 has an attached stamp or notch, so that removal of a printed line 47 can be recognized. When the neutral data carrier 9 is issued, an identification field 48 is printed, using the print head, in addition to the master data read in on strip 46. For example, the identification field can contain the sales value, the validity, the seller company, etc, as well as a bar code, for example. These master data are read in on a track of the magnetic strip 46.

For example, as a print head, a thermal print head 26 can be used (FIG. 1 to 5), which preferably prints line 47, according to FIG. 9, crosswise to the insertion direction. If an ink-jet print head 51 (FIG. 6,7) is used, the printing is preferably done according to FIG. 10 in lines 47, which run parallel to the insertion direction.

The transport mechanism includes at least one upper transport roller and one lower transport roller, between which the data carrier 9 is grasped. An electric motor 11 is provided as a drive, to which is connected a mechanical reduction gear 45. For the power supply of the hand device, a power source 10 is provided, such as a battery, which can be charged via a power connection 8. A computer and control electronics 13 with a memory, an interface 50 and a pulse generator 31 connected to the motor 11 or the reduction gear 45, as well as a send/receive device 7. 70 for infrared waves (FIG. 1,3) and/or 67,68 for radio waves (FIG. 6.7) are represented only schematically.

Figure 1:
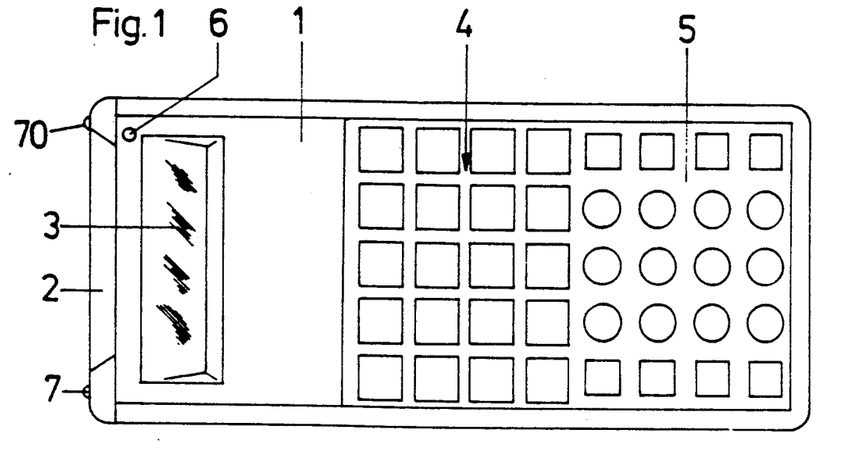
FIG. 1 a top view of a first execution example of the hand device.
Figure 8:
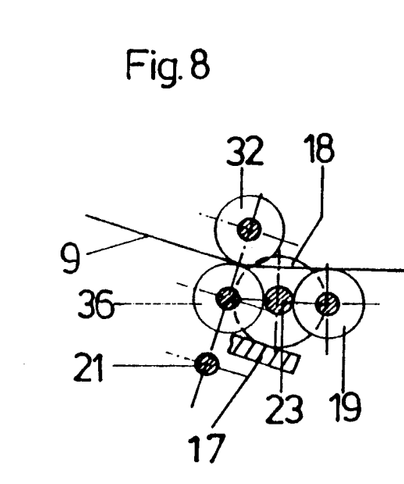
FIG. 8 shows a section through Line VIII—VIII of FIG. 3, FIG. 9 and 10 show execution examples of data carriers in the form of value cards.

In detail, the hand device according to FIG. 1 and 3 and 8 is provided with a transport device that is angled out from the insert slot 2 and then has side guide grooves 29 parallel to the upper side of the housing. In the angle of the guide, the upper transport roller 33, which runs along the entire width, is attached, and there are two lower transport rollers 14, 15, with a space between them.

The thermal print head 26 can be moved around a swinging axis 27 and can reach between both lower transport rollers 14. 15 with its print area. In this way, the upper transport roller 33 serves as a support for the thermal print head 26. Since during the movement of the data carrier 9, the thermal print head is supposed to be held up by it, it is stressed into the print position on one side by a spring 28 and on the other side, a guide strap 25 grasps an eccentric link 24, which opposes the spring 28 and is attached to a clutch shaft 21. The clutch shaft 21 can be engaged to the reduction gear 45 via a clutch 20, particularly a magnetic clutch. Clutch 20 has a return spring 37.

The read/write head 30 is attached in connection to the transport roller 33 on the upper side of the data carrier 9, whereby a support roller 16 is provided on the under side. As can be seen, especially from FIG. 8, the electric motor 11 has a drive shaft with a worm 17, that engages in a gear wheel 18.

A pinion 23 connected to the gear wheel 18 drives on one side a gear wheel 19, on whose shaft the support roller 16 is attached, and on the other side a gear wheel 36, on whose shaft the lower transport roller 14 is provided. Gear wheel 36 engages a gear wheel 32, whose shaft carries the upper transport roller 33 and is provided on the opposite side with a gear wheel 34. This meshes with a gear wheel 35, on whose shaft the second lower transport roller 15 is attached and that engages in a clutch gear wheel 22. This is attached to the clutch shaft 21, so that it is retractable from gear wheel 35 via clutch 20 that pushes shaft 21 aside. Engagement occurs only via a half turn, since the thermal print head 76 is in either working position or in rest position through eccentric link 24. The connection to pulse generator 31 is created by support roller 16 via a friction wheel.

The input keyboard 4 consists in this version of a transparent key film 4, under which a key name sheet 40 is inserted. This is interchangeable and can be slid in via a slot 41 at the end of the housing 1. Below the key name sheet 40, a contact plate 42 is provided. Individual function keys permit optional assignments of the remaining keys, which correspond to the various key name sheets 40. Below contact plate 42, another light film 12 is attached, for which a light sensor 6 is mounted on the housing 1.

Figure 2:
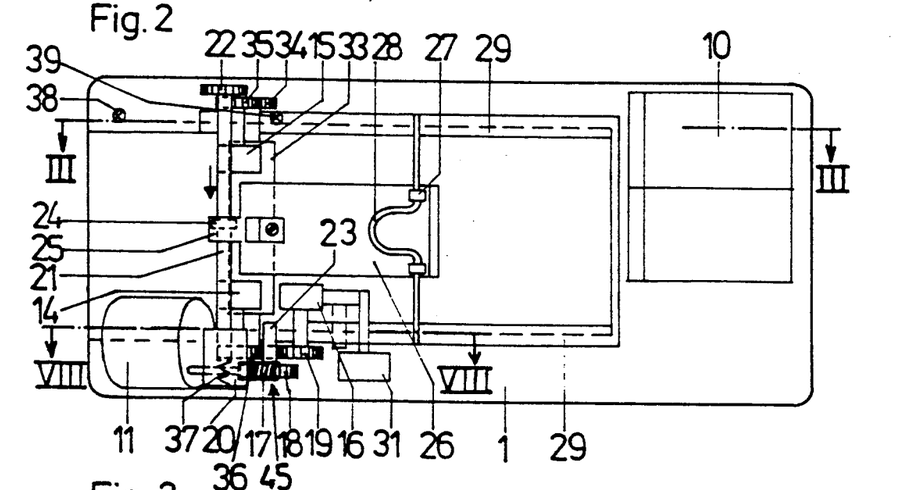
FIG. 2 a view of that from below with bottom removed.

The version according to FIG. 4 and 5 corresponds in its basic parts to the version according to FIG. 1 to 3. In this version, the electric motor 11 is attached approximately in the middle of housing 1, whereby the pulse generator 31 is attached directly to the motor shaft. The preferred reduction gear 45, likewise composed of a manual transmission, is referred to simply as transmission for clarity and actually could also be composed of a drive belt or the like. The further layout of gear wheels 18, 23, 19, 36 and 32 thereby corresponds again to the representation in FIG. 8. Clutch 20 consists of a ring magnet, from which a pin 60 projects, which, on arm 59 that projects to the side, has a clutch disc 58, which is attached to the clutch shaft 21. A clutch disc 57 with teeth around it is attached loosely to the clutch shaft 21 and is continuously engaged with gear wheel 36. Between the two clutch discs 57. 58 a pressure spring 37 is mounted, which opposes the pull of the ring magnets. Clutch discs 57, 58 are thereby engaged by axial displacement of clutch shaft 21, which is actuated via arm 59 of retracting pin 60. The remaining structure of the transport device and the read/write device with thermal print head 26 corresponds to the one in the representation according to FIG. 1 to 3. By moving the electric motor 11 to the middle of the housing, the transport device can be mounted directly on the front of the housing. Thereby, the input keyboard 4 can be lengthened in comparison to FIG. 1. In the version according to FIG. 5, a mutual LCD 43 (backlit by light film 12) is provided for data display and input. Above the LCD 43, a torch screen 44 is attached. The entire input keyboard 4 is programmable so that the key assignments corresponding to the input programs are optional and visible on the display 43.

In both FIG. 3 and FIG. 5, the thermal print head 26 is shown in print position, while, as mentioned, it is held retracted by eccentric link 24 when not in use. In this position, the data carrier 9 can be inserted in the insert slot 2, whereby interruption of the photoelectric barrier 38 causes activation of the hand device from waiting mode and particularly switching on of the transport device with disengaged print head. The data carrier 9 is pulled in and data already present on the magnetic strip 46 are read by the read/write head. As soon as the end position is reached, the data carrier is pushed out again, during which the length pushed out is controlled by the pulse generator 31. This is determined from the data queried when the data carrier is pulled in, and ends respectively before the next free print line 47 of data carrier 9 (FIG. 9). The new data and/or data revisions are input via the input keyboard 4 and read into the magnetic strip via 46 the read/write head 30. At this time, the eccentric link 24 is switched on via the magnetic clutch 20 and rotated 180°, whereby the thermal print head 26 approaches the data carrier 9 and the data revision is printed visibly. Another rotation of the eccentric link 24 raises the thermal print head 26 again, and the data carrier 9 is pushed out again. If a notching or stamping device (not shown) is also provided, the notching or stamping of data carrier 9 occurs simultaneously with the printing.

Figure 6:
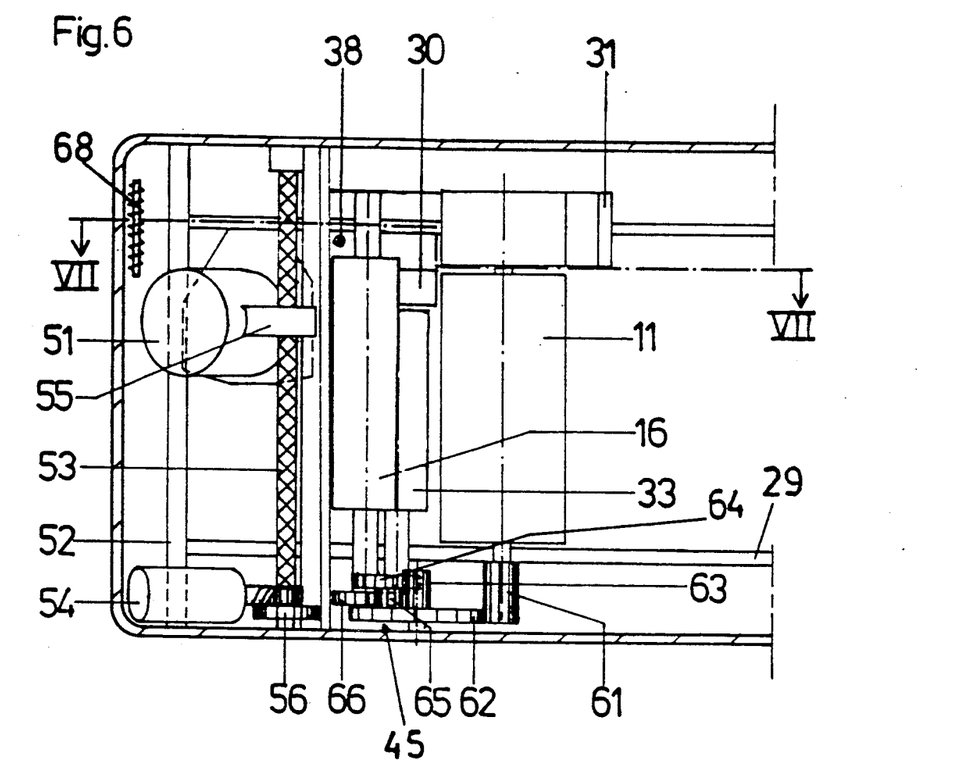
Figure 7:
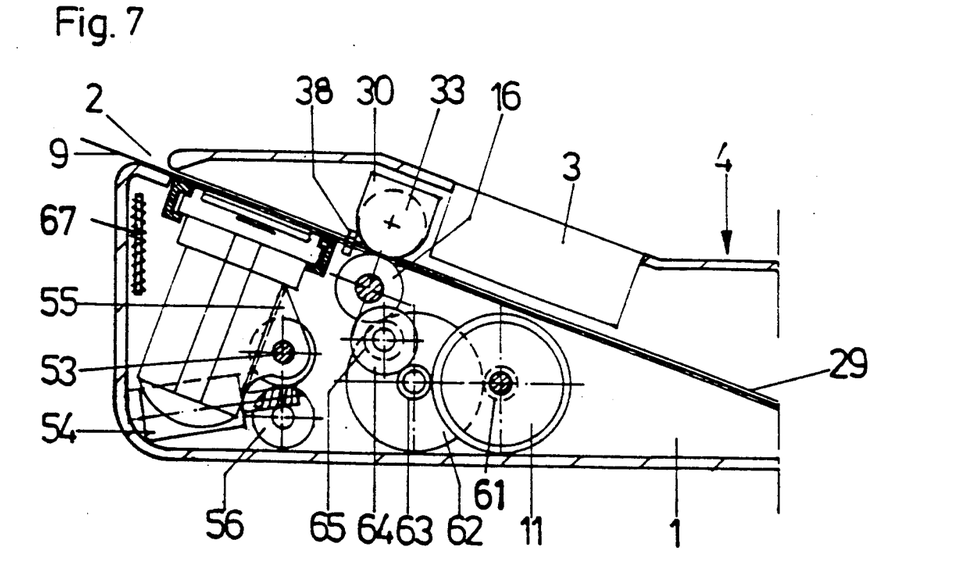

In the version according to FIG. 6 and 7, the printing of the data carrier 9 is done using an ink-jet print head 51. This is attached so it can be moved in a crossrail 52 and has a projection 55, that engages in a driveable screw spindle 53. The screw spindle 53 is driven via a manual transmission 56 and thus the line switching of the ink-jet print head 51 via its own control motor 54.

The transport device encompasses the electric motor 11 with directly connected pulse generator 31, a reduction gear 45, consisting of gear wheels 61, 62, 63, 64 and 65, wherein gear wheel 65 engages in a gear wheel 66, on the shaft of which a lower transport roller 67 is attached that runs across the width. The gear wheel 66 engages with another gear wheel, on the shaft of which the upper transport roller 33 is provided, which in this version grasps only part of the width of the data carrier 9. In the remaining section the read/write head 30 is installed, for which the transport roller 67 serves as a support roller.

Figure 10:
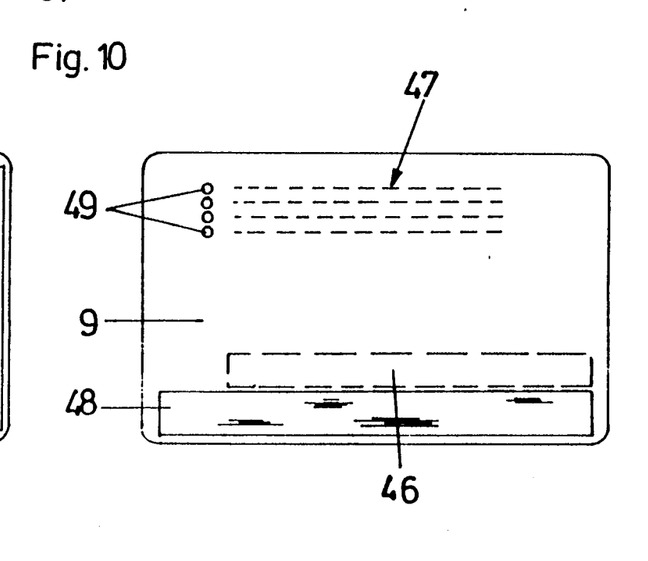

The processing of a data carrier 9 is done in a similar way to the one described above. The photoelectric barrier 38 starts the transport device in motion, whereby the read/write head 30 reads the data present. Upon reaching the insertion end point, the transport device switches to pushing out and the ink-jet print head 51 moves to the next free print line. The data input via the input keyboard 4 are then read in to the magnetic strip 46 and printed in the free line 47. The data carrier 9 shown in FIG. 10 is thereby printed in the lengthwise direction, since the position of the ink-jet print head 51 remains unchanged and the printing process takes place during the discharge procedure.

It would also be conceivable to make the printing crosswise, for which the ink-jet write head 51 would have to be driven across the width with the transport device remaining stationary.

For dialog with active data carriers 69, as shown in FIG. 12 to 17, and which include a processor 120 including peripheral devices, the hand device, as already mentioned, is equipped with a send/receive unit 7, 70 and/or 67, 68.

The send/receive unit 7, 70 and/or 67, 68 permits processing the data contained in data carrier 69 without direct contact between the hand device and data carrier 69. In these versions, it is only required that data carrier 69 be brought close to the hand device (or vice versa). This approach is done within a dimension which practically rules out a disturbance of the dialog by another data carrier that is accidentally or even intentionally present. A practical dialog distance would be up to maximum 30 cm, preferably between 10 and 20 cm.

In the versions shown in FIG. 11 to 14, the data is transmitted via radio waves, whereby the above mentioned small dialog distance can be achieved above all, by low send energy and suitable antenna design. The send/receive frequencies are preferably in a range from up to 250 kHz and below. In this way, magnetic antennas can also be used for sender 67, 115 and receiver 68, 116.

Figure 12:
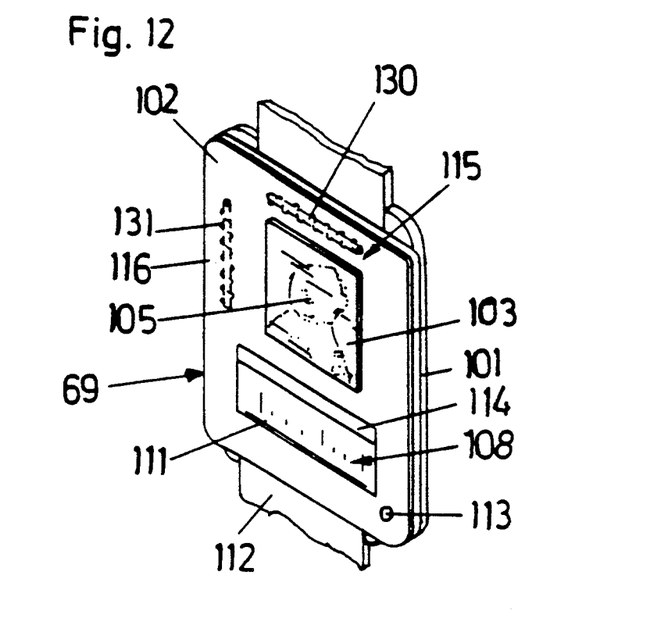
FIG. 12 shows a first version of an active data carrier for communication with a hand device.

As can be seen from FIGS. 6, 7 and 12, the send antennas 71, 130 and the receive antennas 72, 131 are placed 90° from each other in the housing 1 of the hand device as well as in the data carrier 69, so that they do not too strongly affect each other magnetically. Because of the small transmission distance, the design of directionally independent antennas is generally not necessary. But it would be completely conceivable to provide two receive coils 72, 131 positioned opposite each other in the hand device and/or in data carrier 69.

Figure 13:
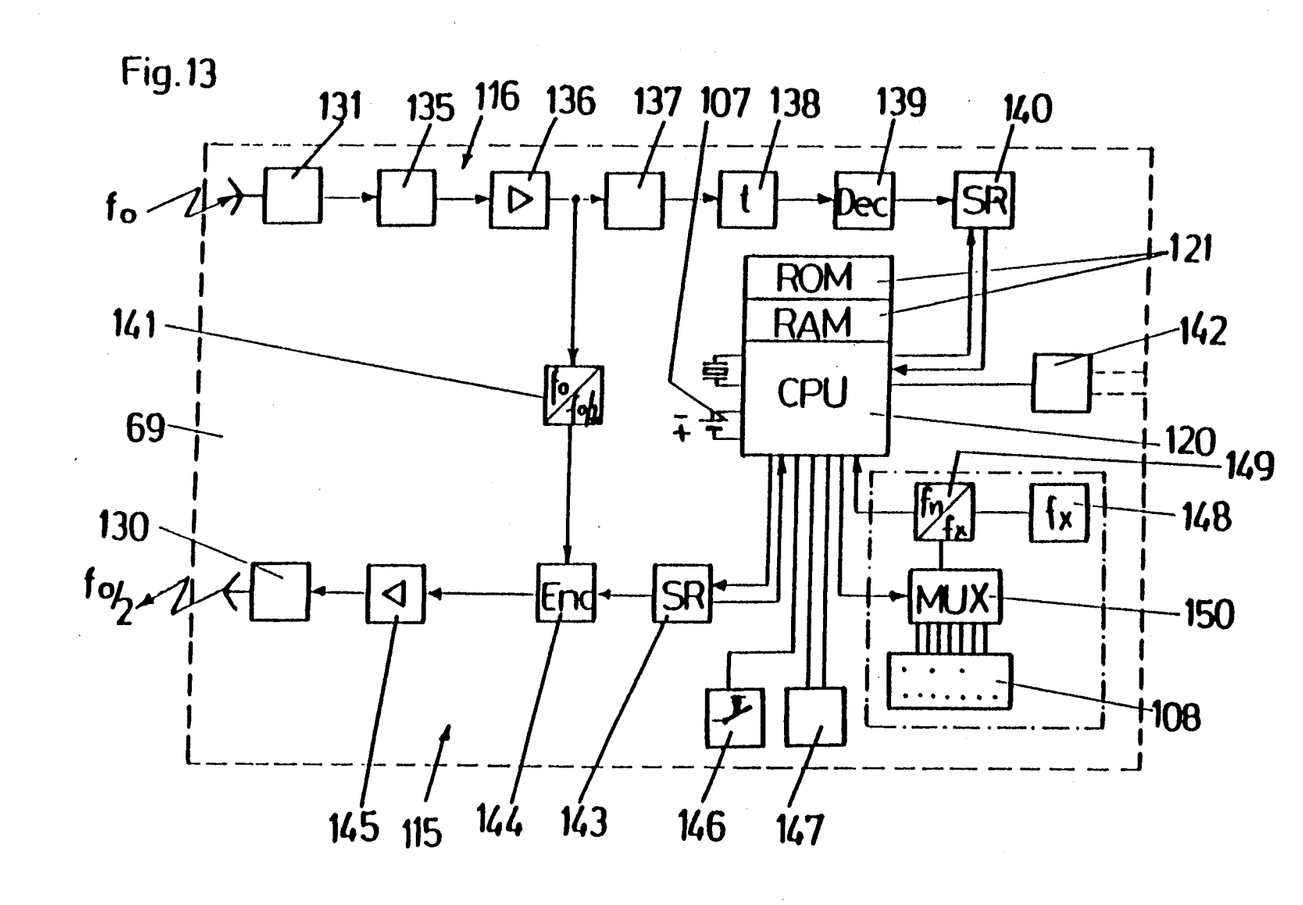
FIG. 13 shows a block wiring diagram of the data carrier per FIG. 12.

The dialog between the hand device and the approaching data carrier 69 will be explained in the following, using the two block wiring diagrams shown in FIG. 11 and 13 of the computer and control electronics 13 of the hand device and the data carrier 69.

Figure 11:
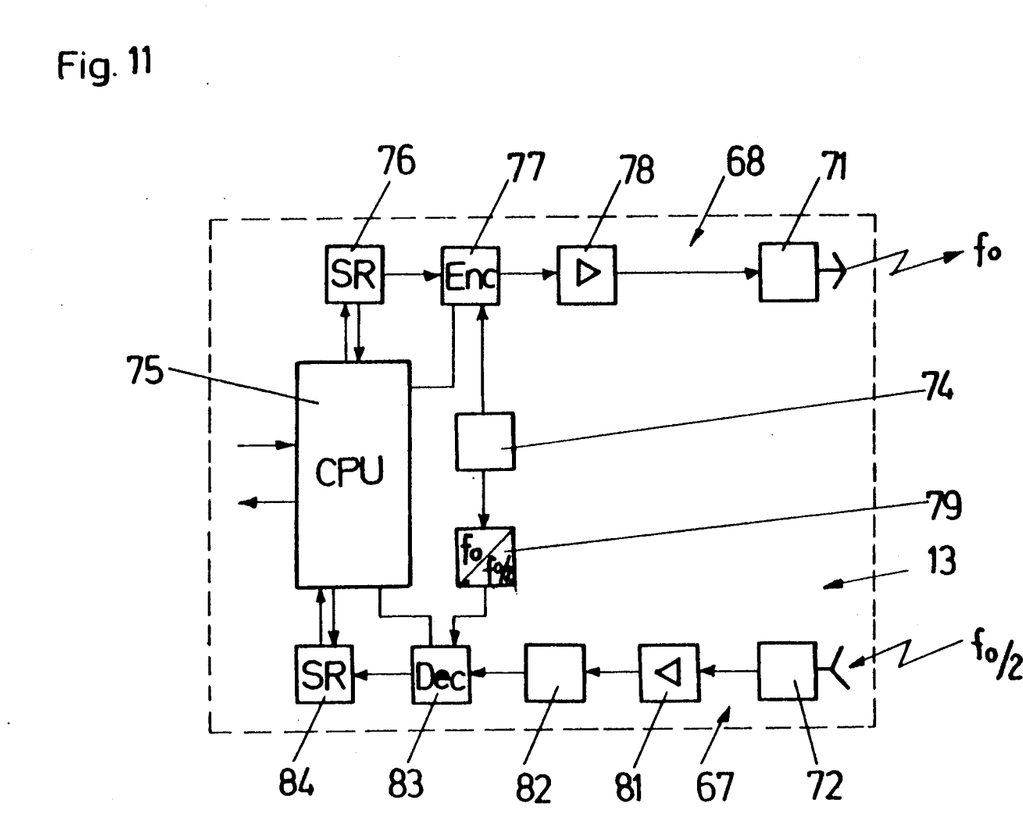
FIG. 11 shows a block wiring diagram of a read/write device of a hand device for dialog with active data carriers.

The computer and control electronics 13 of the hand device sends an identification number with a carrier frequency fo (e.g. 100 kHz) (FIG. 11). For this, the central unit 75 (CPU) transfers corresponding data to a shift register 76 (SR), from which the data are read serially in an encoder 77. The encoder 77 is connected with an oscillator 74 for the carrier frequency fo. The send antenna 71 is operated by the corresponding amplifier 78. The signals output by the hand device (FIG. 13) are received in the data carrier 69 by the receive antenna 131 tuned to carrier frequency fo. The signals are delivered to a low pass 137, which in turn is connected to a decoder 139.

A timer 138 (t) is connected between the low pass 137 and the decoder 139, which prevents accidentally received signals from "waking" the processor 120 CPU) in the data carrier 69.

The decoder 139 transfers the decoded data to a shift register 140 (SR), which interrupts the processor 120 via an interrupt so that it can accept the received read identifier.

The processor 120 converts the read identifier with a specified algorithm, and now sends its own data carrier number back to the hand device as well. The data carrier 69 requires the carrier frequency fo for send traffic from data carrier 69 to the hand device. This is supplied via a frequency distributor 141 (fo/fo)

2 to an encoder 144, which receives the corresponding data via a shift register 143 (SR) from processor 120. The send frequency is now fo/2. This circuit has the advantage that the data carrier 69 does not require its own constant oscillator that needs to be coordinated with the hand device. The signals go over an amplifier 145 and send antenna 130 of the data carrier 69 to the receive antenna 72 in the hand device. From there they are supplied to a decoder 83 via an amplifier 31 and a low pass 82.

From the decoder 83, the data go in a shift register 84 to the central unit 75. This converts the received data with the same algorithm as the data carrier 69 and so can recognize any manipulation attempts, whereby a frequency distributor 79 is connected to the send oscillator 74. The same send frequency fo/2 that comes from data carrier 69 can thus be compared directly.

If, for example, either the hand device or particularly the data carrier 69 is simulated by a counterfeit, the respective, true partner can interrupt data transmission for a defined period of time or permanently after a specified number of transmission attempts.

After this first data transfer, the hand device and the data carrier 69 recognize each other, whereby at the same time, a validity check of both partners has been done, so that the actual data transfer can be executed.

As already mentioned, the processor 120 of the data carrier 69 is normally in sleep-mode, that is, an inactive operating mode with minimal power consumption. It only goes into action if valid data are received. The processor 120 of the data carrier 69 can be activated in order to visibly display the current data status, also especially the remaining value and the executed transactions, on display 108 (FIG. 13). The transfer of data and data entries in the data carrier 69 with subsequent display option via button 146 corresponds to the prints shown in FIG. 9 and 10.

Finally, it is also possible to connect a keyboard 147 for calculating functions, for input of a personal identification number (PIN), etc. In this way, certain operations can be made dependent on input of the identification number. It is also planned to link up with the processor 120 via a serial interface 142.

The data carrier 69 has its own circuit, in order to permit minimum current consumption in inactive operation. This circuit consists of a clock oscillator 148 (fx), a programmable divider 149 (fn/fx) and a multiplexer 150 (MUX) for the LCD display 108. Operational irregularities can be compensated with program control.

The memory 121 of processor 120 preferably has a relatively small ROM area and a relatively large RAM area (e g. 1 kB and 4 kB). In the ROM, only the basic routines for operation of the peripheral modules and for data transfer are stored. In the RAM, application-specific programs are stored, as well as all data. In this way, revisions can easily be made and all transactions can be checked afterwards. The described modules of data carrier 69 are preferably integrated in a single chip, with the exception of the crystal, the LCD displays 108 and the send/receive antennas 130, 131 and a few peripheral blocks.

Figure 15:
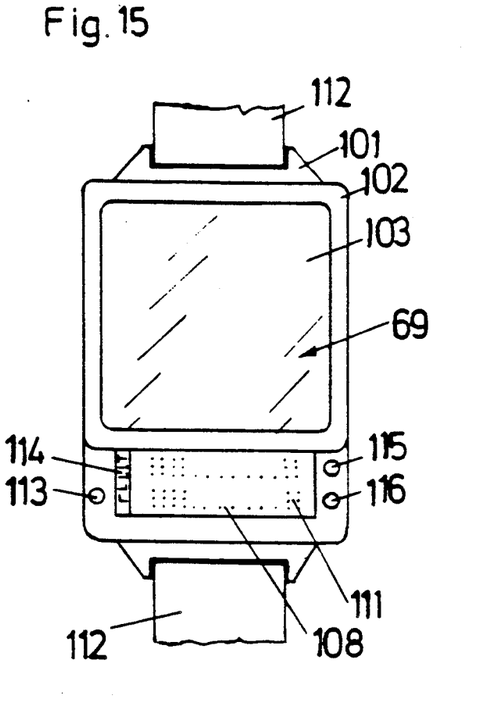
FIG. 15 shows a top view of a second version of an active data carrier.
Figure 16:
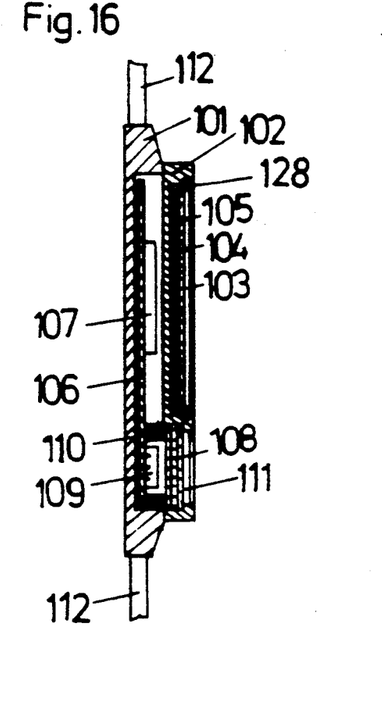
FIG. 16 shows a lengthwise section through the data carrier per FIG. 15
Figure 17:
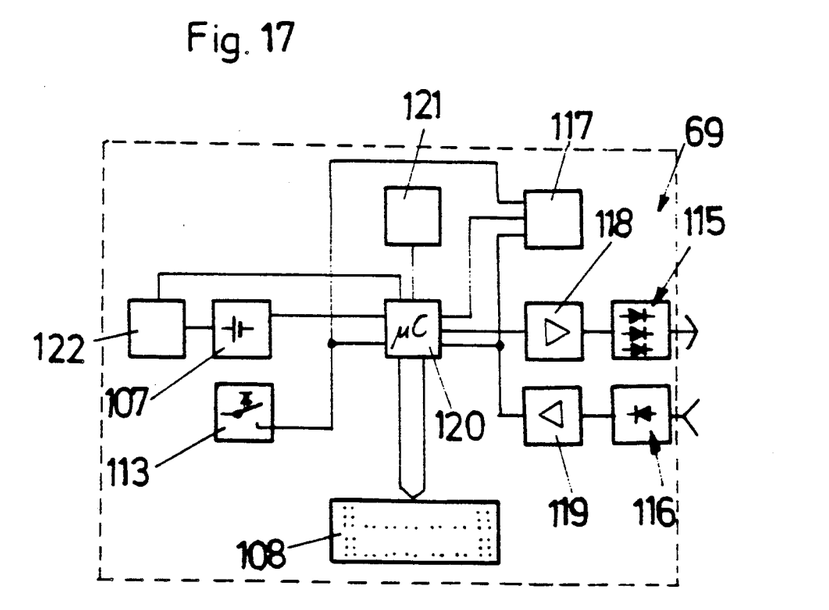
FIG. 17 shows a block wiring diagram of the data carrier per FIG. 15.

In FIG. 15 and 17, a version of a data carrier 69 for optical data transmission, especially via infrared waves, is represented.

The electronics contained in data carrier 69 can be seen in the block wiring diagram in FIG. 17. The central micro-processor 120 (C) is connected with infrared send diodes as sender 115 with corresponding send logic 118, with an infrared receive diode as receiver 116 with corresponding receive logic 119, which is equipped with stand-by logic 117, and with a power source 107; whereby the power source 107 is equipped with a control logic 122, above all when it consists of a battery. The data to be input in the data carrier 69 are stored in a write/read memory 121, particularly an EEPROM or RAM and can be made visible via a fluid crystal display 108 by operating a button 113. The power source 107 can also be a rechargeable battery or a solar cell. In the housing of the hand device, corresponding devices are provided by which sender 7 and receiver 70 are indicated in FIG. 1 and 3.

Figure 14:
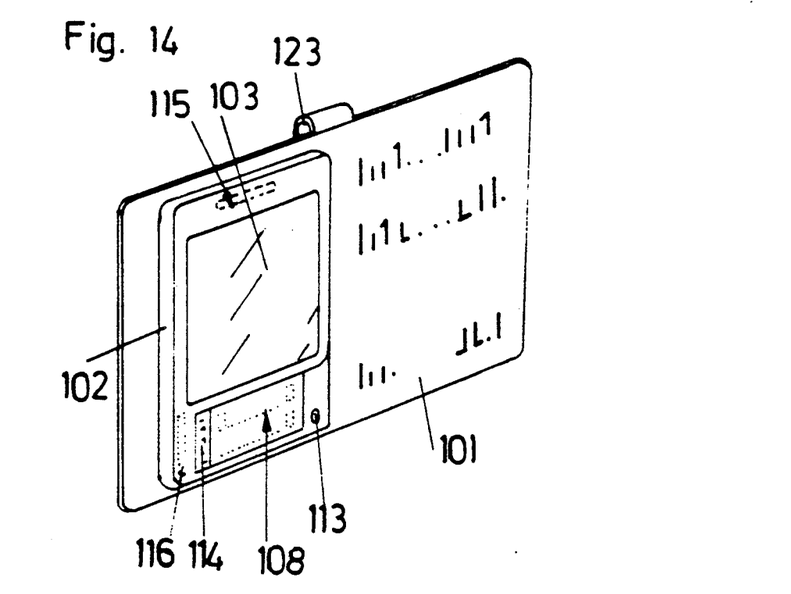
FIG. 14 shows an oblique view of a version of an active data carrier per FIG. 12.

Every data carrier 69 has a housing consisting of a lower part 101 and an upper part 102 (FIG. 12, 14, 15, 16). The housing is particularly of plastic, whereby the two parts 101. 102 are preferably fused together. The lower part 101 of the housing can be present in various executions. According to FIG. 12. 15 and 16, holders for an arm band 112 are provided on the lower part 101, so that the data carrier 69 can work similarly to a watch on the lower arm or wrist. FIG. 14 shows an enlarged, card-shaped lower part 101 with a clip 123, whereby an additional writing field can be present on the lower part 101. The housing can also be designed as a keychain, whereby in the lower part 101, a cord fastened to a key ring is rolled on a spring roll. The lower part 101 can also be equipped with a self-adhesive layer Both the versions just mentioned are conceived mainly for cars (parking garages, toll booths, etc.). The upper part 102 has an attachment 128 for a photo 105 or the like, which is closed by a cover 103. The cover 103 has an adhesive layer 104 on the inside, to which the photo 105 is stuck. The type of adhesive is selected in such a way that when the photo 105 is removed, it is destroyed, and in this way replacement with another photo is recognizable. Below the cover 103, a cover 111 is mounted on the lower part, under which the liquid crystal display 108 is mounted Near the display and/or the photo cover 103, the sender 115 and the receiver 116 for acceptance and sending of data are provided Button 113 is used, as mentioned, to make the data contained in data carrier 69 visible on the display 108. On display 108, a numerical field 114 is provided with a visibly readable, individual number that for example, can be stamped or printed on. This same "serial number" can also be put on the cover 103 and/or even the photo 105. The display 108 is supplied in the usual way by push button via contacts 110 from a chip 109, which is attached to a substrate. The current supply is from a current source 107, for example a battery, a solar cell, etc.

In each dialog with an active data carrier 69, it is brought close to the hand device and the stand-by logic of the data carrier 69 is activated via a send signal of the hand device, after which the stored data can be queried. If the data carrier is, for example, a multiple-trip and/or punch card the hand device will not only check the validity and the value available, but also make a partial devaluations. In this type of data carrier, the additional storage of its individual number is of particular advantage, since bookkeeping can also be done about the continuous devaluations of the hand device, if it is connected to a computer.

Since the data carrier 69 contains processor 120, information and functions can be divided, according to individual judgement, between the data carrier 69 and the hand device, which can complete each other or even overlap.

Above all, accelerated processing is possible because of distanced transmission of data. Since, after the validity expires or the value is used up, another input of a new value is completely possible, the higher production costs of active data carriers 69 are of less importance, especially with yearly or season tickets, ski passes, etc.

An important aspect of the hand device that is the subject of the invention is that processing is not tied to a specific location for data carriers that can receive and contain a multiplicity of different authorizations and values.

We claim:

1. A portable manual device for machine reading, altering and making visible data on value cards which have a magnetic strip on one side and a printable area comprising several print lines on the other side, the manual device comprising:
   a case having a front side and a top side, a slide-in-slot arranged on the front side and a guide path for the card, the guide path having an end point,
   an input keyboard and a display for data display on the top side,
   a computer,
   a memory,
   a power source,
   a read/write device arranged at a first side of the guide path and being able to read data already present on the magnetic strip, the data already present corresponding to already printed lines an determining a following free print line,
   a thermal printhead arranged at the opposite, second side of the guide path and movable from a resting into a printing position, and
   a transport device having a reversible first transport means at both sides of the guide path for moving the inserted card forwardly to the end point of the guide path and backwardly to a position allowing to print the determined free print line, and a second transport means for moving the thermal printhead between the resting and the printing position.

2. A manual device according to claim 1, wherein a mutual backlit liquid crystal display is provided for data display and key display, an illumination sensor being provided on the upper side of the housing.

3. A manual device according to claim 1, wherein the transport device comprises at least one electric motor and a mechanical step-down gear.

4. A manual device according to claim 3, wherein the transport device comprises a switchable coupling being provided between the step-down gear and the movable thermal printhead.

5. A manual device according to claim 1, wherein the first transport means comprises a driven lower roller, arranged opposite to the read/write head at the first side of the guide path.

6. A manual device according to claim 4, wherein coupling is arranged between the step-down gear and an eccentric member, and wherein the thermal printhead is by means of the eccentric member arranged to rotate around an axis between the resting and the printing position.

7. A manual device according to claim 4, wherein a magnetic coupling is used as a coupling.

8. A manual device according to claim 1, wherein the read/write device has a single read/write head.

9. A manual device according to claim 1, wherein the first transport means for moving the card has a transport roller at the first side of the guide path and transport rollers at the second side, said rollers at the second side being arranged coaxially at a distance and the thermal printhead being located therebetween, a center area of the transport roller forming a printing base for the thermal printhead.

10. A manual device according to claim 9, wherein the guide path has lateral guiding grooves inclined diagonally from the slide-in-slot and bent parallel to the top side of the case, all transport rollers and the thermal printhead being arranged in the area of the angle.

11. A manual device according to claim 1, further comprising a notch and punch device for marking the value card.

12. A portable manual device for machine reading, altering and making visible data on value cards which have a magnetic strip on one side and a printable area comprising several print lines on the other side, the manual device comprising:
   a case having a front side and a top side, a slide-in-slot arranged on the front side and a guide path for the card, the guide path having an end point,
   an input keyboard and a display for data display on the top side,
   a computer,
   a memory,
   a power source,
   a read/write device arranged at a first side of the guide path and being able to read data already present on the magnetic strip, the data already present corresponding to already printed lines and determining a following free print line,
   an ink-jet printhead arranged at the opposite, second side of the guide path and movable perpendicularly thereto between parallel line-printing positions, and
   a transport device having a reversible first transport means at both sides of the guide path for moving the inserted card forwardly to the end point of the guide path and backwardly to a position allowing to print the determined free print line, and a second transport means for moving the ink-jet printhead between the line-printing positions.

13. A manual device according to claim 12, wherein the transport device comprises at least one electric motor and a mechanical step-down gear.

14. A manual device according to claim 13, wherein the transport device comprises a switchable coupling provided between the step-down gear and the movable ink-jet printhead.

15. A manual device according to claim 12, wherein the guide path has linear lateral traction grooves extending diagonally from the slide-in-slot into the case.

16. A manual device according to claim 12, wherein the read/write device has a single read/write head.

17. A manual device according to claim 12, further comprising a notch and punch device for marking the value card.

18. A manual device according to claim 12, wherein the ink-jet printhead is movable between the printing lines extending parallel to the guide path.

19. A manual device according to claim 12, wherein the ink-jet printhead is movable between printing lines extending perpendicularly to the guide path.

20. A manual device according to claim 12, wherein a mutual backlit liquid crystal display is provided for data display and key display, an illumination sensor being provided on the upper side of the housing.

21. A manual device according to claim 12, wherein the first transport means comprises a driven lower roller arranged opposite to the read/write head at the first side of the guide path.

22. A portable manual device for machine reading, altering and making visible data on value cards which have a magnetic strip on one side and a printable area comprising several print lines on the other side the manual device comprising:
a case having a front side and a top side, a slide-in-slot arranged on the front side and a guide path for the card, the guide path having an end point,
an input keyboard and a display for data display on the top side, the input keyboard having a transparent key foil, a contact plate and a light foil, and a slide-in-slot for a changeable key type sheet being provided between the key foil and the contact plate,
a computer,
a memory,
a power source,
a read/write device arranged at a first side of the guide path and being able to read data already present on the magnetic strip, the data already present corresponding to already printed lines and determining a following free print line,
a printhead arranged at the opposite, second side of the guide path and movable into at least one printing position, and
a transport device having a reversible first transport means at both sides of the guide path for moving the inserted card forwardly to the end point of the guide path and backwardly to a position allowing to print the determined free print line, and a second transport means for moving the printhead into at least one printing position.

23. A portable manual device for machine reading, altering and making visible data on value cards which have a magnetic strip on one side and a printable area comprising several print lines on the other side, the manual device comprising:
a case having a front side and a top side, a slide-in-slot arranged on the front side and a guide path for the card, the guide path having an end point,
an input keyboard and a display for data display on the top side, the input keyboard having a liquid crystal display, a touch screen arranged thereon, a light foil, and a key assignment being programmable and displayable on the liquid crystal display,
a computer,
a memory,
a power source,
a read/write device arranged at a first side of the guide path and being able to read data already present on the magnetic strip, the data already present corresponding to already printed lines and determining a following free print line,
a printhead arranged at the opposite, second side of the guide path and movable into at least one printing position, and
a transport device having a reversible first transport means at both sides of the guide path for moving the inserted card forwardly to the end point of the guide path and backwardly to a position allowing to print the determined free print line, and a second transport means for moving the printhead into at least one printing position.

24. A manual device according to claim 23, wherein a mutual backlit liquid crystal display is provided for data display and key display, and an illumination sensor is provided on the upper side of the case.

25. A portable manual device for machine reading, altering and making visible data on value cards which have a magnetic strip on one side and a printable area comprising several print lines on the other side, the manual device comprising:
a case having a front side and a top side, a slide-in-slot arranged on the front side and a guide path for the card, the guide path having an end point,
an input keyboard and a display for data display on the top side,
a computer,
a memory,
a power source,
a read/write device arranged at a first side of the guide path and being able to read data already present on the magnetic strip, the data already resent corresponding to already printed lines and determining a following free print line,
a printhead arranged at the opposite, second side of the guide path and movable into at least one printing position, and
a transport device having a reversible first transport means at both sides of the guide path for moving the inserted card forwardly to the end point of the guide path and backwardly to a position allowing to print the determined free print line, and a second transport means for moving the printhead into at least one printing position, and
a communication means for dialogue with an external data-processing device.

26. A manual device according to claim 25, wherein the communication means comprises an interface.

27. A manual device according to claim 25, wherein the communication means comprises a sending/receiving device.

28. A manual device according to claim 26, wherein an infrared-wave sending/receiving device is provided.

29. A manual device according to claim 26, wherein the sending/receiving device has magnetic antennas for radio wave transmission with a carrier frequency range up to 250 kHz.

30. A manual device according to claim 27 for dialogue with data carriers comprising a computer, a memory, a display and a send/receive unit, wherein the communication means comprises a sending/receiving device for distance transmission of data to and from an approaching data carrier which data can be displayed on the display of the data carrier.

31. A manual device according to claim 29, wherein the carrier frequencies for data sending and data receiving are different.

32. Hand device according to claim 30, characterized by the fact that the send/receive unit for light wave transmission is especially designed in the infrared range.

33. Data carrier especially for use with a hand device according to claim 30, characterized by the fact that the data carrier has a housing on which a fastening method is provided for attaching to the person or to an object.

34. Data carrier according to claim 33, characterized by the fact that an arm band is provided as a fastening method so that the data carrier is designed similarly to a wristwatch.

35. Data carrier according to claim 33, characterized by the fact that a clip is provided as a fastening method.

36. Data carrier according to claim 33, characterized by the fact that a retractable cord is wound in the housing, on the end of which a key ring or the like is fastened.

37. Data carrier according to claim 33, characterized by the fact that the housing has a self-adhesive layer.

38. Data carrier according to claim 33, characterized by the fact that the housing is composed of an upper part and a lower part, preferably non-detachable, whereby the fastening method is provided on the lower part.

39. Data carrier according to claim 33, characterized by the fact that the housing has a device to hold a picture of the data carrier owner.

40. Data carrier according to claim 39, characterized by the fact that the device has a transparent removable cover, that is equipped on the inside with an adhesive coating, on which a photo can be stuck.

41. Data carrier according to claim 33, characterized by the fact that the housing contains an electronic clock.

42. Data carrier according to claim 33, characterized by the fact that it has an individual, visually readable number, particularly stamped or printed on a part connected with the memory.

43. Data carrier according to claim 40, characterized by the fact that the individual number is also stamped or printed on the photo to be included and is preferably also read into the memory.

44. Data carrier according to claim 33, characterized by the fact that it has a stand-by circuit, which can be activated via a signal output by the hand device.

* * * * *